(12) United States Patent
Murray (10) Patent No.: US 12,544,194 B2
(45) Date of Patent: Feb. 10, 2026

(54) DENTAL ABUTMENT INSERT EXTRACTION AND INSERTION TOOL

(71) Applicant: Judson Murray, Farmers Branch, TX (US)

(72) Inventor: Judson Murray, Farmers Branch, TX (US)

(*) Notice: Subject to any disclaimer, the term of this patent is extended or adjusted under 35 U.S.C. 154(b) by 189 days.

(21) Appl. No.: 18/225,288

(22) Filed: Jul. 24, 2023

(65) Prior Publication Data
US 2025/0009481 A1 Jan. 9, 2025

Related U.S. Application Data

(63) Continuation of application No. PCT/US2023/069768, filed on Jul. 7, 2023.

(51) Int. Cl.
*A61C 8/00* (2006.01)
*A61C 13/265* (2006.01)

(52) U.S. Cl.
CPC ........ *A61C 8/0089* (2013.01); *A61C 13/2656* (2013.01)

(58) Field of Classification Search
CPC ... A61C 8/0089; A61C 13/2656; A61C 13/12; A61C 3/025; A61C 3/08; A61C 3/10; A61C 17/00
See application file for complete search history.

(56) References Cited

U.S. PATENT DOCUMENTS

| | | | | |
|---|---|---|---|---|
| 797,684 A | * | 8/1905 | Harper | A61C 3/00 433/143 |
| 1,138,355 A | * | 5/1915 | Carr | A61C 3/00 433/143 |
| 1,187,497 A | * | 6/1916 | Canfield | A61C 1/141 81/114 |
| 1,327,477 A | * | 1/1920 | Ivory | A61C 17/00 433/143 |
| 1,406,143 A | * | 2/1922 | Bates | A61C 3/10 2/10 |
| 3,309,773 A | * | 3/1967 | Weller | A61C 7/02 433/3 |
| 3,690,005 A | * | 9/1972 | Edelman | A61C 8/0089 433/176 |

(Continued)

*Primary Examiner* — Eric J Rosen
*Assistant Examiner* — Hao D Mai
(74) *Attorney, Agent, or Firm* — Kearney, McWilliams & Davis, PLLC; William Yarbrough (57) ABSTRACT

A device for dental prosthetic insert insertion and removal and system providing a tool and intuitive method directed to extraction and replacement of a low insertion force, securely fixed, easily manipulated and highly robust dental inserts for an implantable overdenture abutment prosthetic. Said dental insert placement and replacement tool offers an apparatus for consumer-based, individualized patient-based extraction and insertion of a "snaps" or dental inserts structure exhibiting an adjustable retentive strength and durability rating providing optimum retentive engagement and rotational movement, over an abutment projection, and atop an abutment member which requiring a low level of manual dexterity coupled with high prosthetic retentive effectiveness and ease of insert replacement and replacement.

11 Claims, 10 Drawing Sheets

(56) References Cited

U.S. PATENT DOCUMENTS

| | | | | |
|---|---|---|---|---|
| 4,060,897 A * | 12/1977 | Greenstein | A61C 13/12 | 433/144 |
| 4,167,063 A * | 9/1979 | Sosnay | A61C 7/02 | 433/3 |
| 4,206,547 A * | 6/1980 | Tanaka | A61C 3/08 | 433/141 |
| 4,270,902 A * | 6/1981 | Wiland | A61C 3/10 | 433/144 |
| 4,377,381 A * | 3/1983 | Westman | A61C 17/036 | 433/144 |
| 4,552,531 A * | 11/1985 | Martin | A61C 5/42 | 433/141 |
| 4,564,035 A * | 1/1986 | Turner | A61C 15/02 | 132/323 |
| 4,586,901 A * | 5/1986 | Tanaka | A61C 3/08 | 433/164 |
| 4,643,676 A * | 2/1987 | Jansheski | A61C 3/00 | 433/143 |
| 4,759,713 A * | 7/1988 | Heiss | A61C 3/00 | 433/141 |
| 5,004,419 A * | 4/1991 | Kline | A61C 3/00 | 433/143 |
| 5,090,907 A * | 2/1992 | Hewitt | A61C 3/00 | 433/144 |
| 5,127,833 A * | 7/1992 | Kline | A61C 3/00 | 433/141 |
| 5,244,390 A * | 9/1993 | Lazzara | A61C 3/00 | 433/143 |
| 5,388,989 A * | 2/1995 | Kountis | A61C 3/10 | 433/141 |
| 5,407,293 A * | 4/1995 | Crainich | F16B 7/20 | 403/348 |
| 6,099,310 A * | 8/2000 | Bornstein | A61C 19/06 | 433/141 |
| D435,106 S * | 12/2000 | Tang | D24/176 | |
| 6,231,340 B1 * | 5/2001 | Kildea, Jr. | A61C 5/42 | 433/102 |
| 6,309,219 B1 * | 10/2001 | Robert | A61C 3/14 | 433/144 |
| 6,755,815 B2 * | 6/2004 | Schultz | A61B 17/68 | 606/1 |
| 8,152,525 B2 * | 4/2012 | Rossi, III | A61C 13/12 | 433/167 |
| 8,366,714 B2 * | 2/2013 | Jones | A61B 17/7083 | 606/104 |
| 8,616,880 B2 * | 12/2013 | Viscomi | A61C 5/62 | 433/164 |
| D802,136 S * | 11/2017 | Angermeier | D24/152 | |
| 2003/0022131 A1 * | 1/2003 | Kangasniemi | A61C 3/00 | 433/141 |
| 2010/0035206 A1 * | 2/2010 | Buttacavoli | A61C 13/225 | 433/146 |
| 2013/0337404 A1 * | 12/2013 | Feine | A61C 17/20 | 433/80 |
| 2015/0125816 A1 * | 5/2015 | Ladd | A61C 3/00 | 433/147 |
| 2015/0313612 A1 * | 11/2015 | Edwards | B23B 31/005 | 606/80 |
| 2017/0319298 A1 * | 11/2017 | Lee | A61F 2/0059 | |
| 2017/0333169 A1 * | 11/2017 | Hoang | A61C 8/0089 | |

\* cited by examiner

DENTAL ABUTMENT INSERT EXTRACTION AND INSERTION TOOL

FIELD OF THE INVENTION

The present invention is an apparatus, system and method of use that is directed to extraction and replacement of a low insertion force, securely fixed, easily manipulated and highly robust dental insert for an implantable overdenture abutment prosthetic, generally. Said invention offers an apparatus for individualized extraction and insertion of a "snap" or dental insert structure exhibiting a high retentive strength durability providing retentive engagement and rotational movement over a rounded abutment projection at the top of the abutment member.

BACKGROUND

Dentures, a prosthetic device in the oral cavity supported by surrounding soft and hard tissues, can serve one of many purposes for the edentulous patient. First, replacement of teeth serves the physical goals of (a) allowing a patient to properly masticate food prior to ingestion and digestions and (b) assist in the pronunciation of words, fricatives and sibilants in particular. Second, replacement of teeth has an aesthetic impact wherein teeth replacement gives a more natural appearance and may have profound effects on a patient's self-confidence and self-esteem. For any one of the above reasons, or a combination of reasons, dentures provide a necessary function to daily activities in terms of functionality and appearance.

Generally, those patients having no teeth require dentures (more appropriately "prosthetic dentures") which fall into three broad categories: (1) standard complete dentures, those without semi-permanent (or permanent) fixing to the underlying bone, which are removable partial or complete dentures often suffering from poor retention, (2) implant-retained dentures, also referred to as overdentures, or those prosthetics which "snap onto" implants fixed within bone, removable for maintenance and cleaning and having improved retention, and (3) fixed ("fixed screw") prosthetics which, by design and so named, are permanently adhered to bone of the maxillary and/or mandibular arch. As described, cost for the various forms of prosthesis is directly related to permanence where standard dentures are the least expensive and fixed screw retained implant-supported dentures are the most expensive.

As would be anticipated, the loose, unsecured retention of standard dentures and the cost of fixed screw dentures push many patients to select overdentures as a preferred means of teeth replacement. Pointedly, implant overdentures are a preferred treatment option for the edentulous patient wherein, among other types of prosthetic devices, overdentures (i.e., "snap-in" dentures) are indicated when a dental patient's needs are addressable either through a semi-fixed implant prosthesis or through a complete denture wherein retention is maintained through the use of attachments placed directly on implants or on bar superstructures of the bone. Specifically, where some patients present with soft and hard tissue defects not remedied with a fixed implant prostheses, implant overdentures provide retention and stability for replacement of lost hard and soft tissues in a manner that fulfils masticatory, phonetic and esthetic functional requirements.

While fixed-screw restorative structures may be preferred where patients have low to moderate bone atrophy and, equally, where patients are capable and willing to perform adequate oral hygiene procedures. But there exists a need in patients with high bone loss and/or with lower capabilities to maintain oral health, a need for implant-retained overdenture constructions to provide sufficient dental support for everyday functions and aesthetic appearance.

Too, where cost is a factor, fabrication of the superstructure and fixed implant-supported dentures is typically a more expensive option versus implant-retained overdentures, initially. Although, ongoing maintenance of fixed dental implants can help defray at least some cost over the life of the "permanent" dental prosthetics. Though, where fixed implants excel in terms of low maintenance, overdentures may be a less attractive preference due to daily removal, cleaning, maintenance and reinsertion.

Therefore, when compared to a fixed prosthesis, removable dentures (i.e., overdentures) may seem less desirable in terms of increased maintenance requirements and physical manipulation, but as described above, in a certain population of patents, the overdenture may prove superior to fixed dentures in terms of practicality especially in light of cost. And, so long as a patient is capable of achieving the long-term goals of adequate prosthetic and intraoral cleaning as well as maintaining proper oral hygiene measures, the overdenture model is capable of restoring to a qualifying patient restored vertical dimension rivalling even fixed prosthetics as a means of dental replacement.

USE

In application, once the overdenture prosthetic is selected for an identified patient and during the treatment planning phase, fabrication may be undertaken keeping in mind that sufficient inter-arch space must be retained as to avoid the construction of a prosthetic that is too "thin" and susceptible to fracture or split. Typically, two to four bone implants are evenly spaced across the edentulous arch or arches of a patient in the inter-foraminal region of the mandible, and the inter-maxillary sinus region of the maxilla, as necessary or required.

After the applicable space has been measured, a prosthetic has been manufactured and implants are attached to existing bone, the prosthetic is ready for placement into the patient's oral cavity. The implant consists primarily of three components: (1) the "implant" which is the screw placed within the bone, (2) the abutment, connecting the implant to the prosthetic (ex. crown or overdenture) and (3) the prosthesis (i.e., overdenture). Overdentures have specific abutment arrangements consisting essentially of the abutment (for insertion into the implant), a housing or metal "cap" placed into the bottom of the overdenture and, most important to the present application, a dental insert which is most typically a plastic or other elastomeric placement residing inside of the metal housing "snapped onto" the abutment. And while inserts may differ in terms of specifications, dimensions and construction, largely based on the shape and style of the reciprocating abutment (e.g., OD secure, Locator Original, Locator R-Tx, Ball abutment etc.) as well as the size, shape and depth of dental caps, dental inserts almost uniformly fit snugly inside of the appropriately mated dental cap wherein the outer wall of the insert is mated to the inner surface of the dental cap and the inner surface of the insert is mated to the outer surface of the abutment. Variations exist whereby inserts may also have centrally located raised portions (e.g., cylindrical centralized extensions) made to insert within a concave portion of the abutment head to provide securing both outside of and inside of the abutment head for standard inserts or simply a concave circular cavity in the case of extended range inserts. Further, the distance between the abutment and leading edge of the prosthetic overdenture may additionally be accommodated by any number of block-out spacers of various and varying thicknesses and diameters.

Retentive inserts themselves come in two types: standard and extended range. Standard inserts are used where implants reside largely parallel to the supportive bone structure and extended range inserts, as the name would imply, work in various angular positions (i.e., angulation) and provide the greatest utility in terms of function. The dental insert, while securely adhered to the abutment, and in static contact with same, the fit within the dental cap may be either static or pliable and forgiving. If the insert and dental cap assemblage are loosely associated, the dental prosthetic can pivot and provide a range of pivotal movement without losing retention to provide a more elastic and forgiving set of movements during mastication and occlusion. The present invention therefore focuses its attention on extended range inserts, but its use is equally relatable to standard (static) inserts in all but a few overdenture installations.

Although conventional abutments for prosthetics remain a highly effective tool in semi-permanent overdentures, retentive dental inserts, responsible for prosthetic placement, adherence and retention experience excessive wear over time, primarily due to friction and pressure-induced expansion, and thereby allow overdenture movement and heighten the potential for friction-inducing movement or dislodgment. This is typically addressed every 6 to 8 months via a dental visit and may range in the area of $40 to $60, and as high as $100, per insert. To avoid disruption in the effectiveness of an overdenture, old (used) dental inserts must be removed and replaced via a dental appointment and procedure which requires payment and costs of materials. In some cases, adjustment to inserts must be made having various poundages of retention changed as per patient's overdenture requirements for sufficient retention without unduly hampering removal for cleaning. These poundages range commonly from 0 to 8 and go from least retention to most retentive.

Although strides have been made to address the need for a prosthetic abutment insert removal (extraction), placement and replacement device exhibiting a sufficiently low (non-professional) level of manual dexterity as to allow the extraction and replacement of an abutment insert, none yet has supplied the requisite needs for "patient use". Such a device would ideally provide a low insert extraction and insertion force coupled with sufficient simplicity of insertion and manipulation as to allow an average consumer to manage and maintain their own dental prosthetic. And, as considerable shortcomings remain, it is desirable to provide a means and mechanism for those patients having the appropriate ability to remove and replace inserts as necessity demands and hygiene requires. It is the present invention, method and system of use that meets these requirements.

BRIEF SUMMARY OF THE INVENTION

The device as disclosed is for use in a "snap in denture" or an "implant retained overdenture" wherein the "snaps" are utilized to maintain the overdenture's position in the oral cavity where the overdenture is held in but the overdenture is not supportively held up.

The present disclosure provides an apparatus, method and system of use that discloses a mechanical means for removing and replacing dental abutment (retentive) inserts via a dental implement specifically designed for "at home" patient use for those having overdentures also referred to as "snap-in" dentures.

As disclosed within the present specification and accompanying drawings, replacement insert removal/extraction and replacement, of the "snap" (i.e., the plastic insert placed within metal housing embedded into the denture), is typically an "in-office" procedure whereby a dentist would perform the steps required for abutment services. At the point of attachment of the implant, placed within the jawbone, and eventually the overdenture, typically "ball shaped", circular or spherical abutment posts communicate with the denture via a metal housing on one end and is screwed into the jawbone on the other. It is here where the retentive snap/insert, most commonly plastic, rubber, or another elastomeric compounded insert, resides for shock absorption, facilitation of movement without displacement and retention. These snaps are rated for various "holding" or retention abilities in pounds of force which are typically color-coded (e.g., black –0, (light) blue 1.5 pounds, (medium) pink 3 pounds, (high) clear five pounds) whereby "pounds" refers to strength required for removal/extraction. However, the coloring is arbitrary and may exist only as a color coded system insofar as the dentist/patient may come to recognize depending on manufacturer.

As the point of greatest friction, the area between posts and snaps, where the shock absorbing dental insert resides, the initial insert will most likely be the least poundage rated dental insert that will successfully retain the overdenture, disallowing slippage due to vertical and horizontal movement. Posts though, in most embodiments, have a retentive "ring" or "lip" about its most distal blunt surface providing the proper seat for an insert as to promote adherence of the insert to the post. The dentist thereby may need to increase the poundage (retentive) strength of an insert to a post to find the proper balance between retention and removal for cleaning.

The dental prosthetic is then placed over the posts and pressure is to be applied evenly to the superior surface of the overdenture (i.e., the "teeth" of the prosthetic) to push the overdenture onto the posts digitally to allow them to "snap" on to the abutment. Uneven distribution of pressure may cause uneven force placement and off-axis, angulation that causes undue stress in the post-denture juncture which may cause premature cracking or breaking.

In the immediate future adjustments may need to be made as to both ensure proper placement of the overdenture to the posts and ensure that the posts are best quipped to retain the overdenture. Those posts having surfaces that are uniformly horizontally conforming apply less stress across a prosthetic. But posts not placed in parallel and out of alignment cause stress across the implant and excessive wear at the communication point between post and snap. Excessive wear at this juncture, as evidenced by excessive insert replacement, may indicate that the alignment needs to be corrected, the overdenture needs a new fitting or that the posts require adjustment or replacement.

Also, over time, as the parts of the jawbone without implants continue to recede, where the denture itself is non-elastic, the dentures become looser and, instead of resting on the bone, will rest on the implant posts and not the gums, and the posts will fully support the prosthetic. The post function is to hold the overdenture in place and not to fully support the device. In this case, the posts themselves will wear into the plastic overdenture causing wear to both the plastic overdenture and the posts themselves as well as potentially causing overdenture cracking, splitting, chipping or breaking. As the posts wear, degradation of the posts' retentive members become more pronounced and posts, and/or overdentures, thereby may need to be realigned and/or replaced.

While, devices exist in the art constructed to execute the extraction and insertion process, none exist currently that are designed with attention toward the typical consumer, along with their capabilities and limitations, in order to create an easily consumer-manipulatable device for a patients' "in home" or "at home" use.

Indeed, inventor has developed an ergonomic and operationally-simplified tool and processes of use that will aid the denture wearing patient in maintaining, modifying and adapting the patient's own prosthetic without the need of a dentist and/or an office visit. In fact, inventor's simplified design structures, as opposed to the prior art's complex extraction and insertion tool, requires a low to medium level of knowledge, skill and experience in insert manipulation, removal and installation. Most vital, where this service to date has only been available through and by consultation and by denture/insert manipulation by a licensed dentist or other dental professional, those patients who do not have immediate access to a dental professional are not able to adequately maintain their overdenture.

It is therefore within the contemplation of inventor that a simplified device, and intuitive method of use of said device, be provided to those patients unable to attend and/or afford the many visits required for prosthetic maintenance. Too, those patients living in rural or remote locations, having little access to dental offices, will benefit greatly where barriers to access, via access to the present invention (together with clear, understandable instructions), are lowered and the ability to maintenance one's own prosthetic is untethered to a dental office and related armamentarium which democratize overdentures upkeep and maintenance. Yet, it is also within inventor's purview to provide for a variable-component kit, containing one to a plurality of extraction and insertion tools, various poundages of inserts and simplified instructions providing for successful prosthetic maintenance "in home".

The extraction and insertion device that is the present invention, is a largely linear device, having a handle (shaft) portion, which may be tubular, angular, solid, hollow or a combination thereof, having a pointed first blunt end for insert removal and/or placement from and into a dental cap and a second "hooked" end for insert extraction. This same shaft portion may be knurled (e.g., straight, angled or crossed lines), checkered, or otherwise indented as to provide increased friction and ability to grip the shaft as to enhance control and reduce slippage during operation. Otherwise, the shaft portion may have angular portions, rounded areas or flat features to create more "grip-ability". Likewise, rubber or neoprene may be used to provide greater control. Yet, as bacteria labile surfaces are utilized, opportunities for reuse diminish reciprocally.

Structurally, the first end is a blunt end, seating attachment/tool, while maintaining a largely flat surface, creates a perpendicular surface to the device's centrally-running axis, which may further be equipped with a series or plurality of raised surfaces, protrusions, creating elevated portions about the perimeter of the truncated (barrel) tubular portion of the first operable component end of the device. These raised series of protuberances serve to reversibly grip attached inserts, pressing outwardly, as to aid in either insert removal and attachment. The same blunt end may be insertable, screwable, or otherwise attachable to a cylindrical receiving portion of a shaft.

The second end is an operable extraction portion of the present invention, itself is a largely "hook-shaped" dental scaler/probe, which consists of a thin, curved portion extending to a terminal point. This dental scaler/probe is constructed to extend distally away from the handle (shaft) portion in a first direction. This manually operable extraction portion is utilized, via the terminal point, to pierce or impale a dental insert, draw an elastomeric portion away from an abutments concave cavity and to wholly remove the insert from the abutment cavity. The insert is thereafter removed from the hook portion of the device and then discarded.

In particular, either the first or second operable component (blunt or hook) may be used by the user as necessity dictates for removal of a used/worn insert. Moreover, the second operable component may be used for removing any buildup of food or plaque which may tend to occlude a given dental cap space and contiguous areas. Although, only the blunt first operable component is designed for dental insert placement and insertion.

Once insert removal is accomplished, the device that is present invention may then be repositioned to utilize this blunt second end to fit upon this second end a dental insert, removably, to its blunt end for placement of the insert into a dental cap. This may be preloaded for the convenience of the patient or loadable (mating the blunt end with an insert) by the patient. This may be achieved with the same or a different poundage insert as necessity requires whereby poundage typically starts low and moves higher. As well, this process is completable through various repetitions until the desired poundages are inserted into each abutment housing. Alternatively, the same blunt end may be used to remove an insert, wherein the blunt end, with or without raised protrusions, applies pressure on all internal sides of a dental insert and, upon twisting, may effectively remove an insert.

The shaft itself may be rigid, semi rigid or like construction of metal, plastic or composite material. In terms of inserts, the inserts themselves may be color coded to signify pound strength which could be further signified as 0-8, light, medium or heavy or a combination thereof.

Inserts themselves are available in a variety of elastomeric materials including nylon, silicone, and thermoplastic polymers such as polyetheretherketone (PEEK), or polyetherketoneketone (PEKK). Inserts themselves allow for 10 degrees to 20 degrees of divergence which may exhibit even greater flexibility depending on material used (e.g., high performance PEEK inserts).

Functionally, the mating of the (male) blunt end and the (female) hollow core of the insert may be further assisted where the inserts themselves are presented to the device operator in a supportive encasement where the first, blunt end of the device is introduced into the insert wherein the inner insert's surface meets the outer surface of the blunt end component of the device and is halted from advancing any further when these two surfaces communicate. In opposite, the insert, to be placed within the dental cavity's concave cavity, is then received and "gripped" into this cavity flatly where both flat surfaces are abutted, whereby the insert is placed squarely wherein the retentive force of the abutment exceeds the blunt end's force, and the insert remains in the dental cap upon removal. This may be further facilitated by angling the device, rotating the device or a combination thereof as to overcome the retentive force of the insert on the blunt end of the device for both removal and insertion release.

In light of oral hygiene, it is envisioned that each tool be a single-use tool, but inventor also contemplates a device having reusable components whereby the first and second ends may be replaceable and interchangeable as to provide ease of operation and extended use beyond a single insert removal and insertion cycle device.

In terms of the functional components of the present device, the present invention exhibits additional key features aiding in its operation including two modes of insert removal and one mode of insert insertion. The former allows patients alternative means of removing a used or worn insert but a single means for insert insertion via said device for ease and simplicity.

BRIEF DESCRIPTION OF THE DRAWINGS

Novel features characteristics of the application are set forth in the appended claims. However, the application itself, as well as a preferred mode of use, and further objectives and advantages thereof, will best be understood by referencing the following detailed description when read in conjunction with the accompanying drawings, wherein:

And while the device, system and method of use of the present application is susceptible to various alternative forms and modifications, specific embodiments included herewith have been shown by way of example in the drawings and are herein described in detail. It should be understood, however, that the description, enumerating specific embodiments, is not intended to limit the application to the particular embodiment disclosed, but on the contrary, the intention is to cover all modifications, equivalents, and alternatives falling within the spirit and scope of the present application as defined by the appended claims read in context of the disclosure.

LISTING OF NUMBERED FEATURES overdenture dental prosthetic 15
dental insert 20
dental cap 25
abutments 30
implant screw 33
jawbone 35
first end attachment 40
first end 45
outer rim 50
plunger 55
counterclockwise turning 57
clockwise turning 60
first end male tubular 65
first extraction and insertion device component 75
extraction and insertion component 80
protrusions 85
head 86
peaks 87
truncated barrel outer surface 88
valleys 89
conically-shaped neck 90
shoulder 92
insertable shaft 94
skirt 95
shoulder/flange 97
second (extraction) component 100
scaler 110
angled hook portion 125
tool handle 200
handle first end 210
handle second end 220
insert extraction and insertion tool 300

DETAILED DESCRIPTION AND BEST MODE OF IMPLEMENTATION

Illustrative examples of various preferred embodiments are described below and depicted in the figures. It must be appreciated that in the development of any preferred embodiments, numerous references are made to the spatial relationships between various components and to the spatial orientation of various aspects of components as the devices depicted in the appended drawings. However, as will be appreciated by those having skill in the art, after a complete reading of the present application, the devices, members, and apparatuses described herein may be positioned in one of many desired orientations which addresses the above deficiencies of the prior art. Thus, the use of terms to describe a spatial relationship between various components or to describe the spatial orientation of aspects of such components (e.g. blunted end, first end, "hook-shaped probe", second end, shaft, and the like) should be understood to describe a relative relationship between the components or a spatial orientation of certain aspects of such components, respectively, whereas the device described herein may be oriented as to provide an ergonomic, simplified insert extraction and insertion tool construct that is designed explicitly for a low-force, simply applied tool allowing for ease of prosthetic care and maintenance by the overdenture patient.

The present invention will be understood by those having skill in the art, both as to its structure and function, taken in conjunction with the accompanying description and drawings. It should be understood that various components, parts, and features of the different embodiments may be combined together, separable, placeable, replaceable and/or interchangeable with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate.

Figure 1:
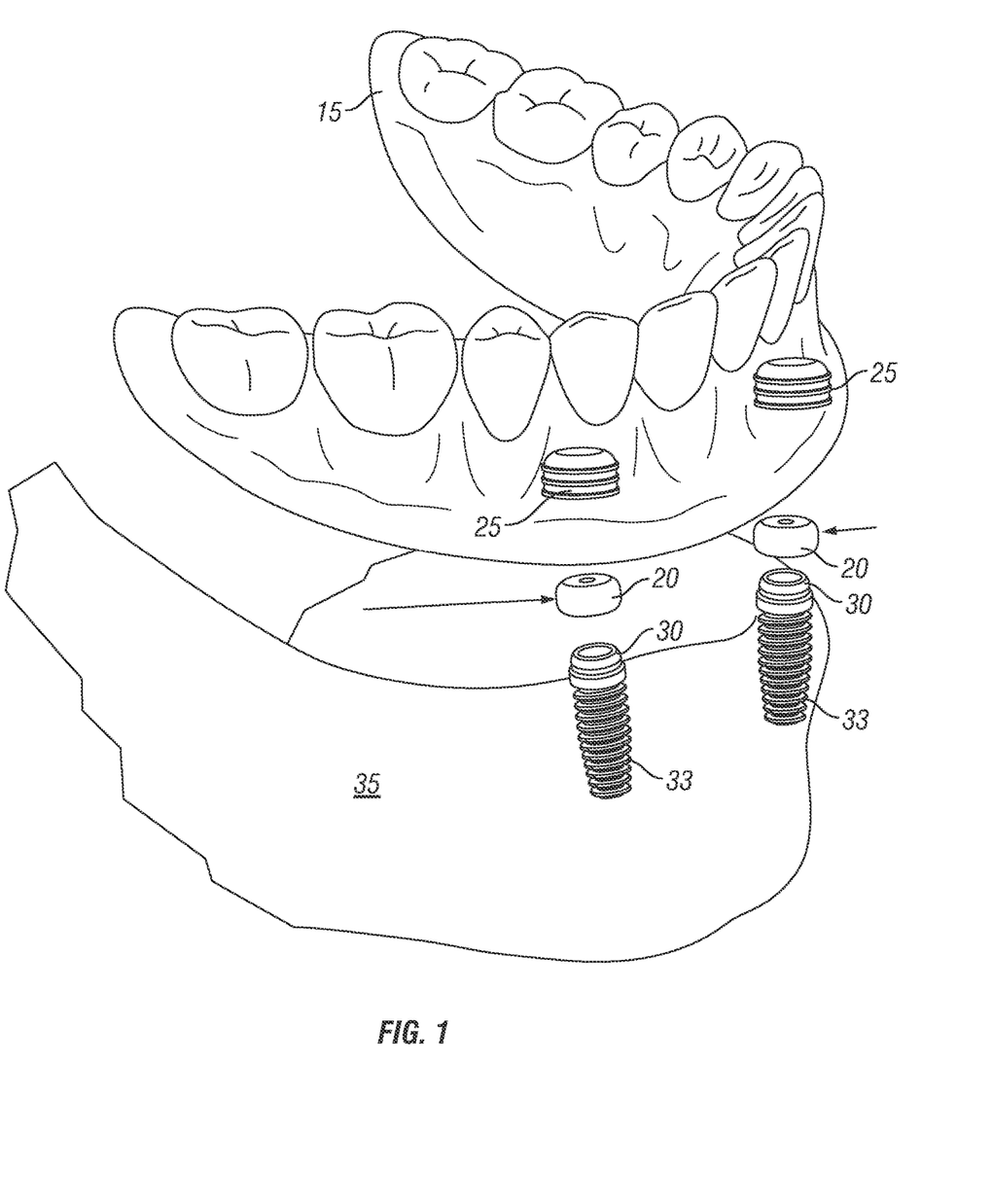
FIG. 1. shows an exploded, perspective view of an overdenture, abutment and dental implants.

Referring to FIG. 1, FIG. 1 illustrates a typical overdenture dental prosthetic 15 wherein dental implants 20 are adhered to jawbone 35 whereby removably placed abutments 30 are made to receive the convex, inner portion of a retentive dental implant 20. The dental implant 20 is further made to fit within a dental cap 25 which is affixed within the prosthetic denture 15.

Figure 2A:
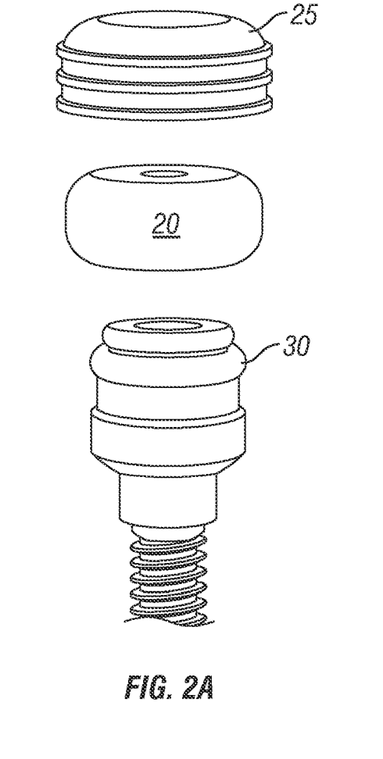
FIG. 2A illustrates a metal prosthetic denture cap, dental insert and abutment implant.
Figure 2B:
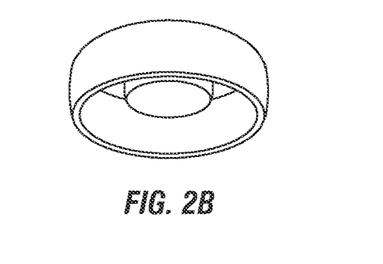
FIG. 2B shows a standard range insert.
Figure 2C:
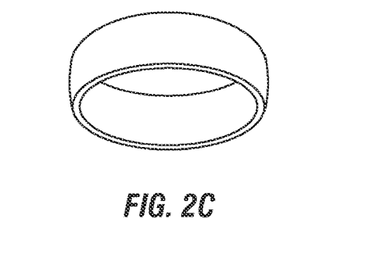
FIG. 2C is an extended range insert.

As shown in FIG. 2, the prosthetic abutment 30 consists of a dental cap 25 which resides superior to a dental insert 20 which is made to fit atop an abutment 30 on a dental implant 33. In operation, the dental cap would be affixed within the prosthetic overdenture (See FIG. 1) and the implant screw/dental implant 33 attached the abutment 30 would be in the jawbone 35 of patient (see also FIG. 1). The essential wear item that is the dental insert 20 is the flexible "cushion" lying between both "permanent" fixtures, prosthetic abutment 30 consists of a dental cap 25, responsible for securing, positioning of the prosthetic overdenture 15 and absorption of frictional wear between abutment 30 consists of a dental cap 25.

Figure 3:
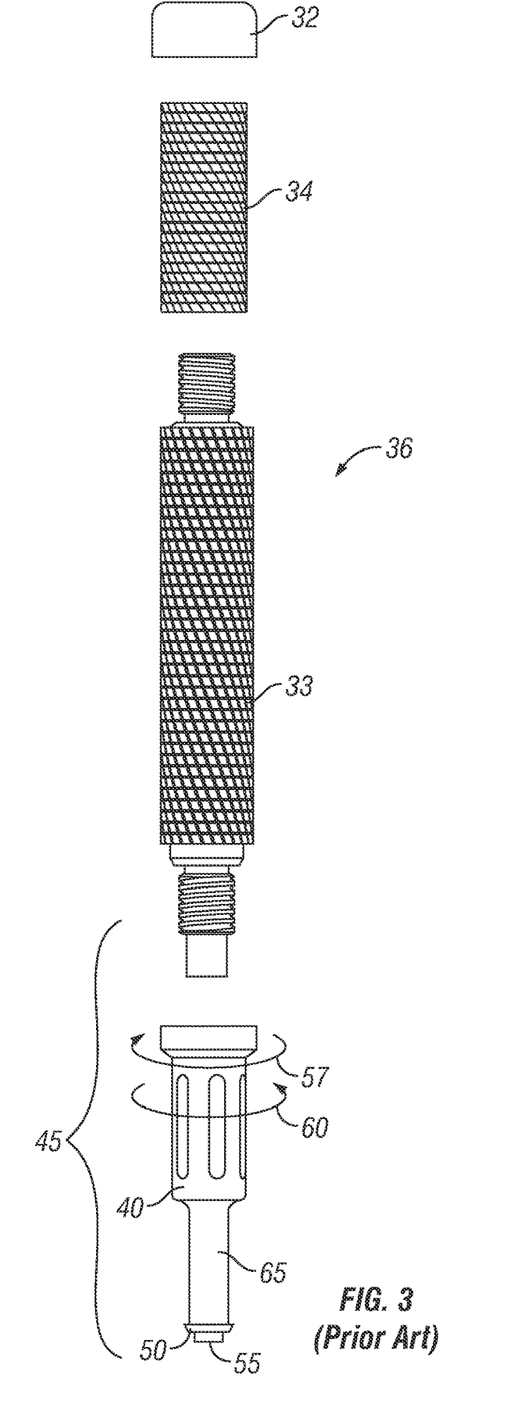
FIG. 3 displays a prior art insertion and extraction tool.
Figure 4:
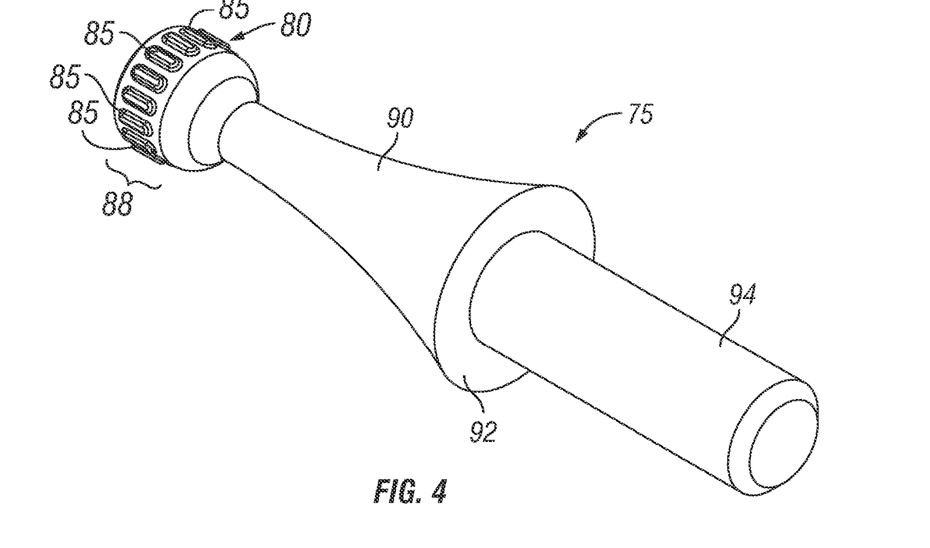
FIG. 4 shows a rear perspective view of an insert insertion tool.

FIG. 3 is representative of the "core tool" 36 used most commonly in dental overdenture insert extraction and replacement consisting of a male retention insert removal/extraction and insertion first end attachment 40 attached to a seating tool 38 that is attached to an abutment driver 34 and sleeve 32, linearly. This first end 45, constructed of a hollowed, tubular portion with a pronounced outer rim 50 at its most distal point is introduced into a concave portion of a dental insert, straight and without tilt, whereby the mechanism is then tilted for insert extraction by grabbing the insert's edge (not shown). The insert is then adhered to the first end 45 and then removed forcibly via inserted, encircled plunger 55. In operation, the plunger 55 is retracted through the advancement and counterclockwise turning 57 of the first end attachment 40 and is then utilized, through advancement and turning clockwise 60 in the opposite direct, to introduce the plunger 55 forward within the attached dental insert (not shown) for forced insert ejection. The plunger is thereafter retracted within the first end male tubular 65 wherein a new dental insert may then be loaded upon the same first end 45. Too, the "core tool" has an additional feature at the opposite end for abutment tightening which in most all cases is entirely out of the purview of the typical (and target) consumer. Too, as the previous description enumerates, the complexity and required manual dexterity of the "core tool" far exceeds that of the average consumer and forms the basis of the advancements and improvements of the present device and methods of use.

Figure 15:
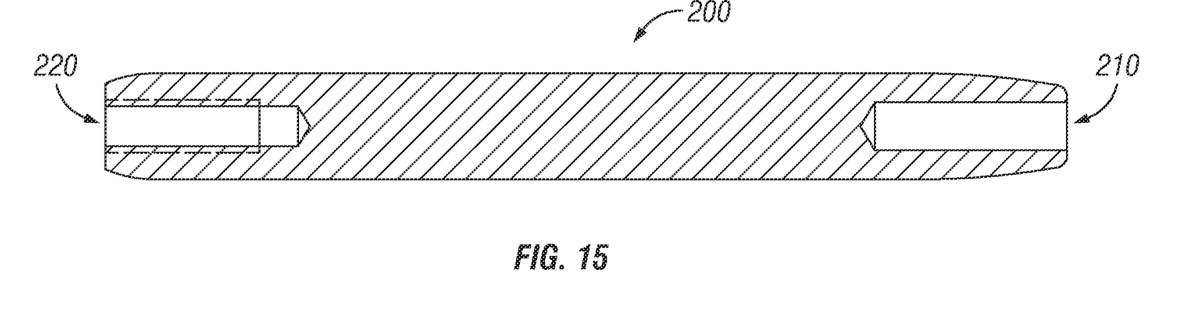
FIG. 15 is a side view of the device handle of FIGS. 15 and 16.
Figure 16:
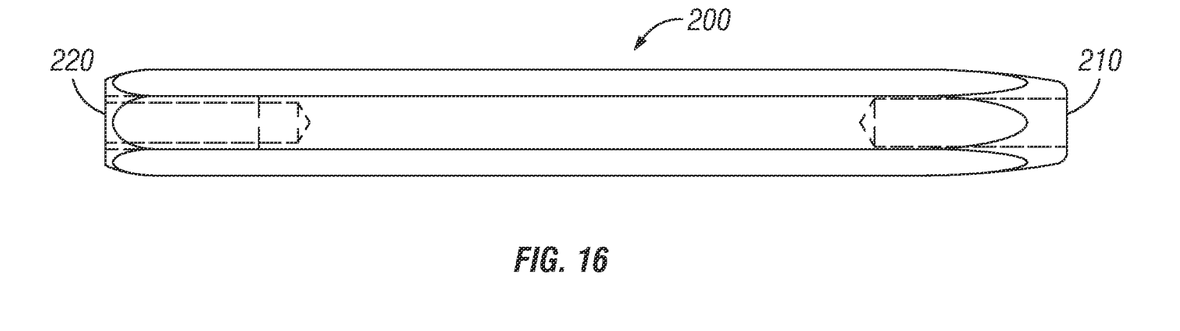
FIG. 16 displays a multi-sided version of FIG. 17.

FIGS. 4-6 and 10 illustrate a top view extraction, side view and end view, respectively, of a first extraction and insertion device component 75 that is the present invention's first operable component featuring an extraction and insertion end 80 exhibiting an extension (conically shaped neck 90) featuring a truncated barrel shape at its tapered most distal portion with raised protrusions 85 existing about the perimeter of the outer barreled surface 88 made to run parallel to first extraction and insertion device component's 75 axial centerline. The insertion extraction and insertion device component 75 is further defined by a conically shaped neck 90 having a marked shoulder 92 and insertable shaft 94 wherein the insertable shaft 94 consists of a tubular extension 94 for placement into a handle first end 210 (See FIGS. 15, 16 and 18) or handle second end 220 (See FIGS. 15, 16 and 17) of a tool handle 200.

Protrusions 85, as depicted are uniformly-placed raised half-cylinders placed about the perimeter of a truncated barrel shape. Yet, it is in the contemplation of inventor that these raised protrusions may also be raised "brail bumps", half spheres, half-squares, half-rectangles, incline planes, any practically any raised uniform or non-uniform shape, reciprocal indentions, similarly shaped equivalents, and the like, capable of creating friction-aided distribution of force within an insert which is exhibited about the exterior of said truncated barrel-shape, regularly or irregularly, as provide the proper grip within the interior portion of an inset 20 for extraction or insertion. As disclosed in the present application, each half-cylinder protrusion is exhibited uniformly about the outer surface of the truncated barrel and is made to run co-extensive with the axial center of said first operable component. Of note, while the scaler portion's use is directed toward extraction, the extraction and insertion device component 75 with protrusions 85 may be used for both insert 20 extraction, positioning and insertion.

In the alternative, first extraction and insertion device component 75 may have a "lip", "rim", edge, or "ledge" (not shown) encircling the tip of the extraction and insertion device component's 75 most distal region wherein said "lip", "rim", edge, or "ledge" encircles the distal tip and acts to secure the dental insert 20 about the extraction and insertion device component 75 in both extraction and/or insertion into a dental cap 25.

Figure 7:
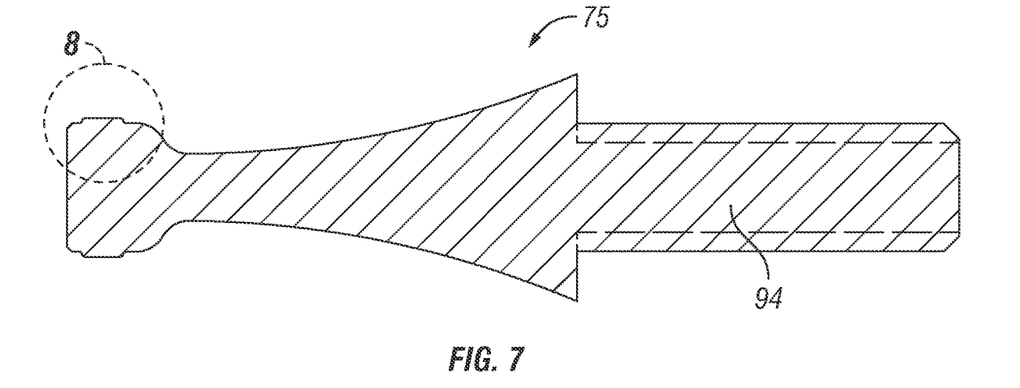
FIG. 7 depicts a cutaway of the insertion tool displaying castellations.

Referring to FIG. 7 displays a (a) side cross-sectional view along the longitudinal (centerline medial) plane including protrusions 85 about the perimeter of the extraction and insertion device component 75.

Figure 8:
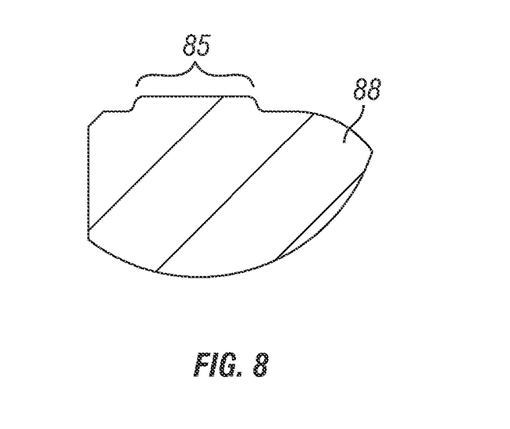
FIG. 8 shows a cutaway of the encircled portion of FIG. 7.

FIG. 8 provides a zoomed in, cross-sectional axial plane cutaway of a portion of outer barrel surface 88 and pronounced raised protrusions 85 of FIG. 7.

Figure 5:
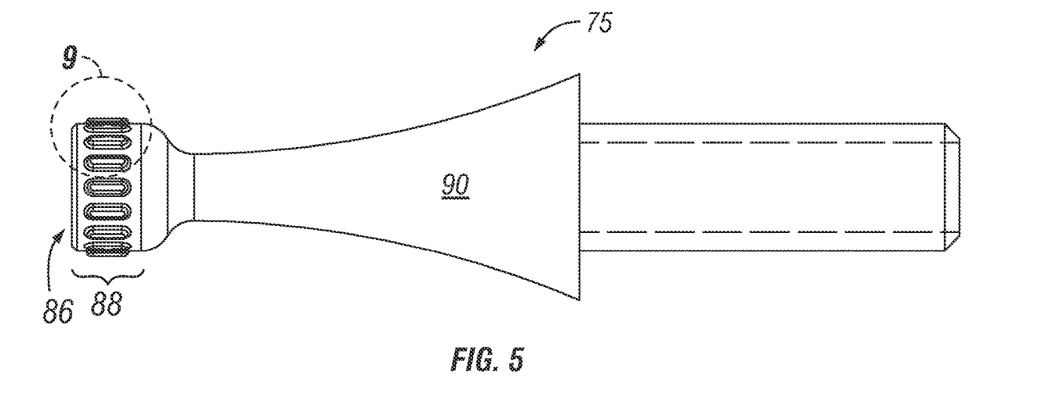
FIG. 5 exhibits a side view of the insertion tool of FIG. 4.
Figure 6:
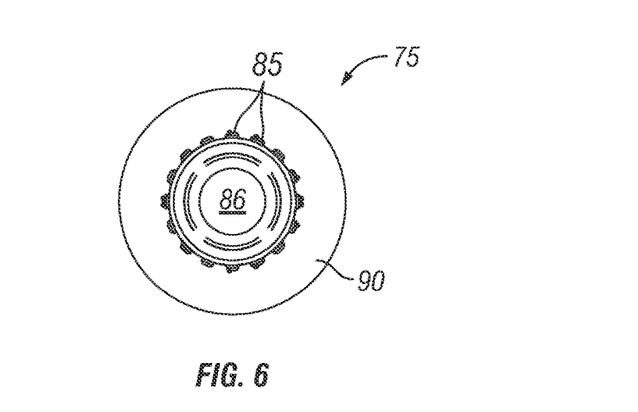
FIG. 6 is a front view of the invention.
Figure 9:
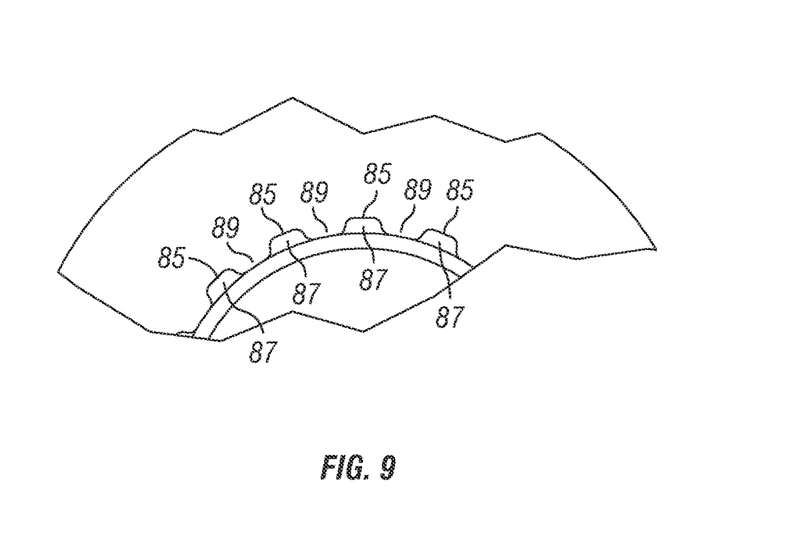
FIG. 9 illustrates the castellations of FIGS. 8 and 9
Figure 10:
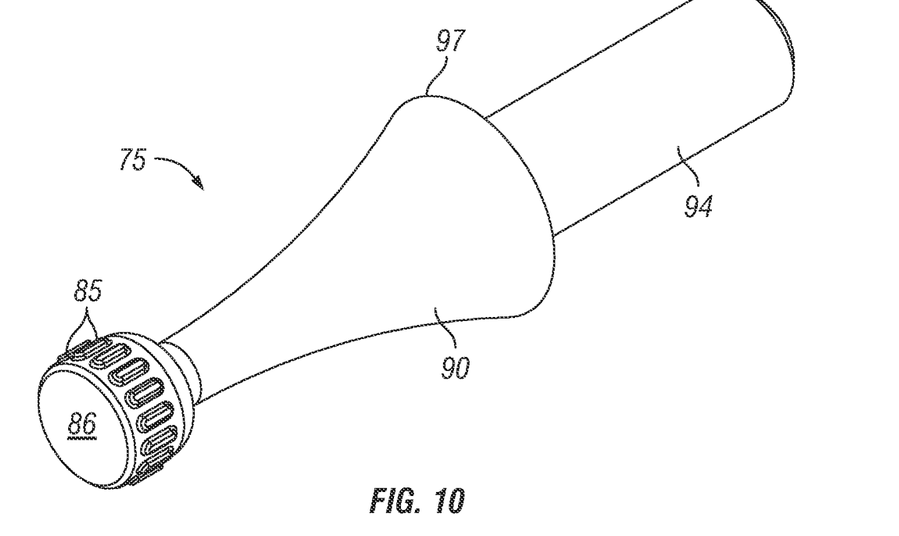
FIG. 10 shows a forward superior view of an insertion component.

FIG. 9 provides a 90-degree rotation of FIGS. 5 and 7 whereby a bisection of FIG. 5 is visible from a front view and along the transverse (axial) plane of the insertion component of FIG. 5. Here, protrusions 85 are defined by a plurality of sequential protrusions characterized by a repeating sequence of peaks 87 and valleys 89 where each raised protrusion is responsible for extraction and insertion of dental inserts 20 for insert 20 removal, placement, replacement and securing. This is further evidenced in FIG. 10 displaying said head 86, peripheral protrusions 85 about the circumference of the outer barreled surface 88 sitting atop a conically shaped neck 90 having a skirt 95, as well as the tubular extension for component 94 placement into tool handle 200.

Figure 11:
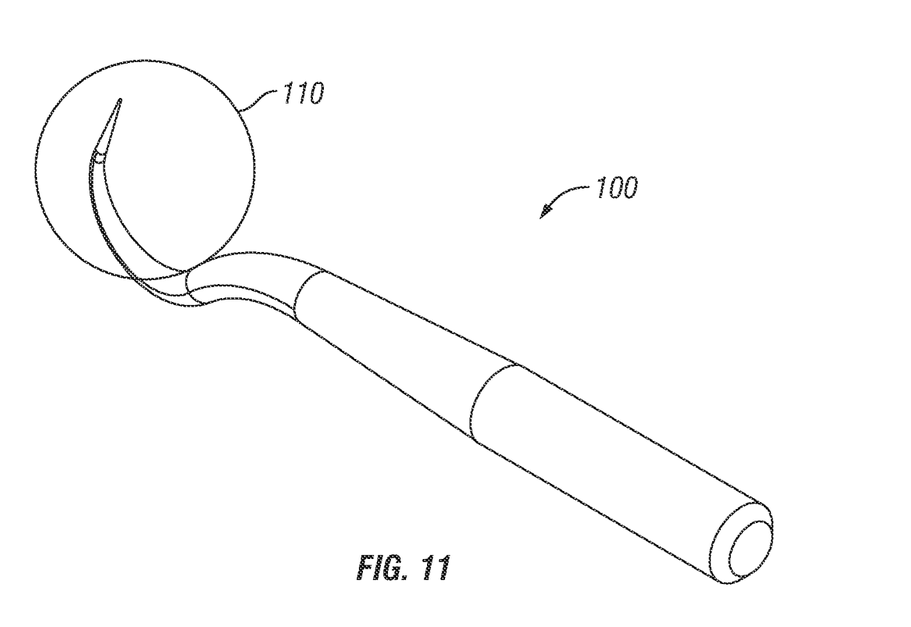
FIG. 11 displays a hook, removal/extraction component of the present invention.
Figure 12:
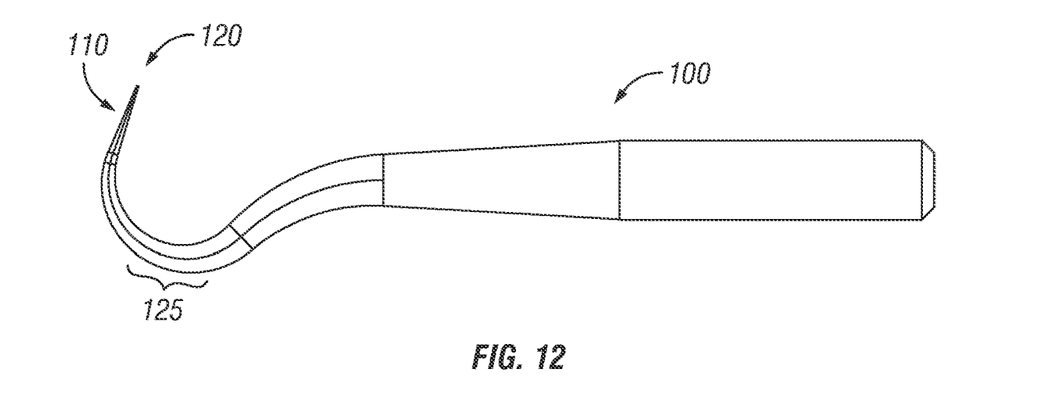
FIG. 12 is a side view of a hook, removal/extraction component of the present invention.
Figure 13:
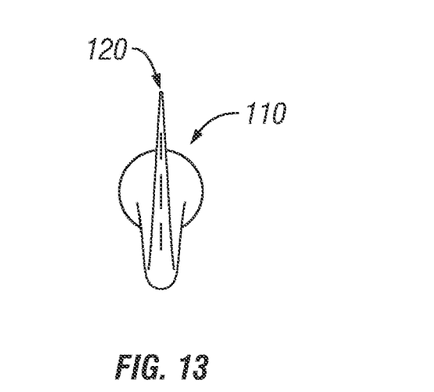
FIG. 13 illustrates a rear view of the hook, removal/extraction component of FIG. 12.
Figure 14:
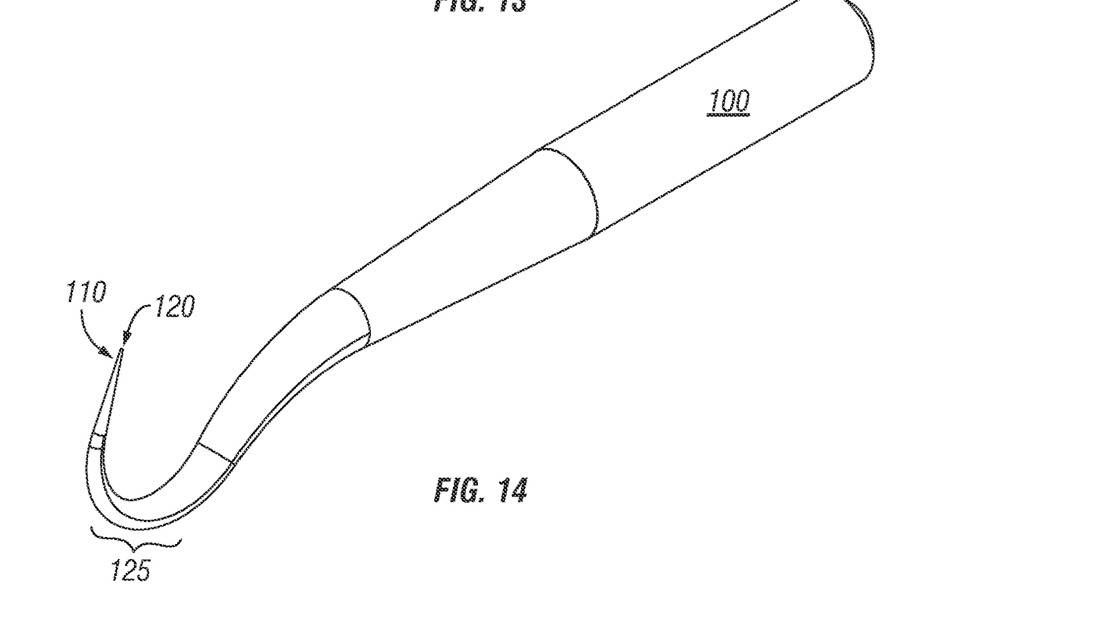
FIG. 14 shows a superior perspective view of the hook, removal component of FIG. 12.

Referring to FIGS. 11-14 each depicts a second (extraction) component 100, exhibiting a hook-shaped feature for extraction, whereby hook-shaped scaler 110 is detailed from a posterior perspective view in FIG. 11, a side-view in FIG. 12, an anterior view in FIG. 13 and an anterior perspective view in FIG. 14. In operation, hook-shaped scaler 110 is securely fixed to either handle first end 210 handle second end 220, wherein said first extraction and insertion device component 75 is secured to the unoccupied handle first end 210 handle second end 220, and a complete insert extraction and insertion tool 300 (as depicted in FIGS. 20 and 21).

Referring now to FIGS. 15-19, a securing member for the receiving and securing of first extraction and insertion device component 75 and second (extraction) component 100 into either first and second ends 210, 220. As presented, tool handle 200 is representative of both a receptacle for said first extraction and insertion device component 75 and second (extraction) component 100 (harboring said hook-shaped scaler component 110) as well as a means for physically manipulating, securing and positioning each component 75, 100. In operation, each component is securely affixed and fixed within each first end 210 and second end 220 of said tool handle 200 wherein each may be interchangeable, depending on necessity and/or requirements, or permanently affixed to tool handle 200.

Figure 20:
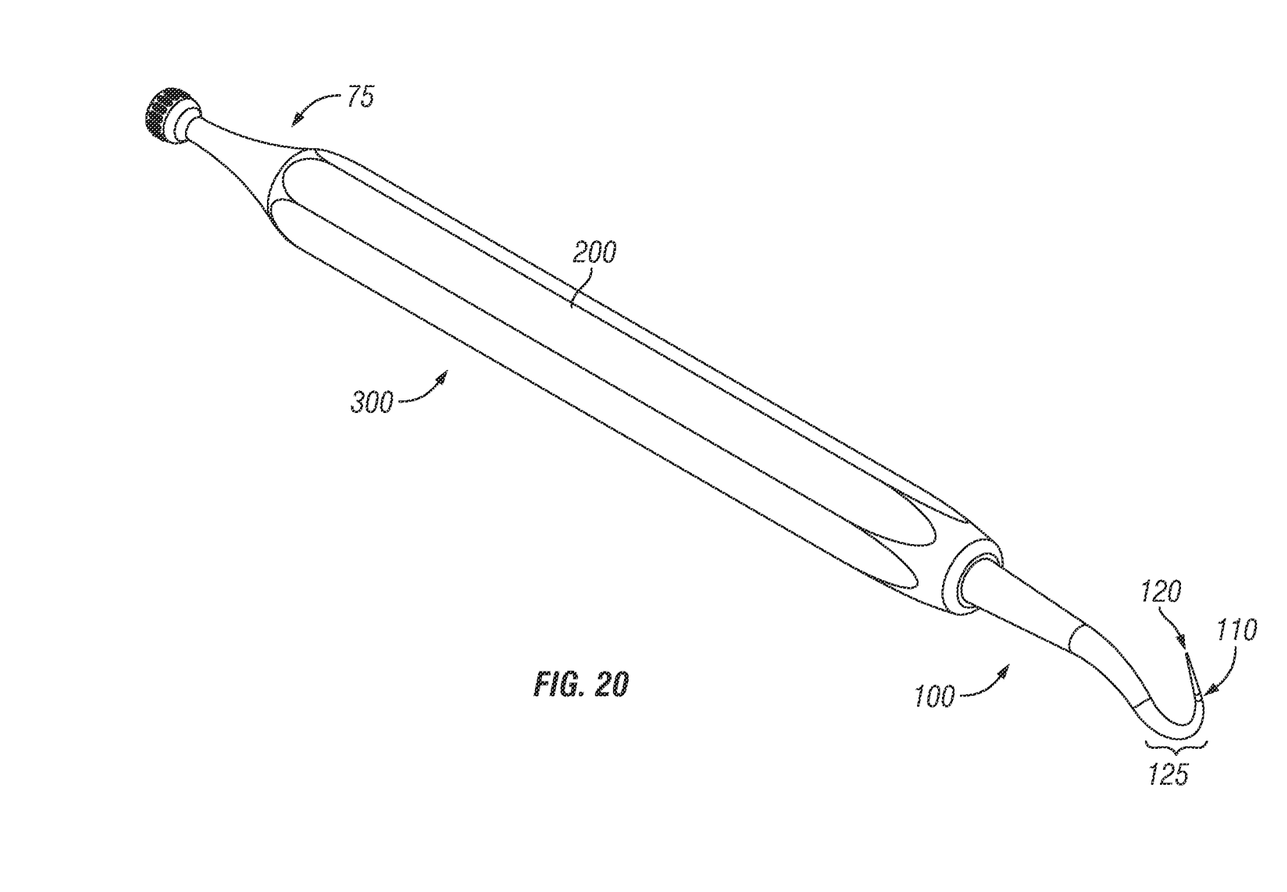
FIG. 20 is a fully integrated side, perspective view of the present invention.
Figure 21:
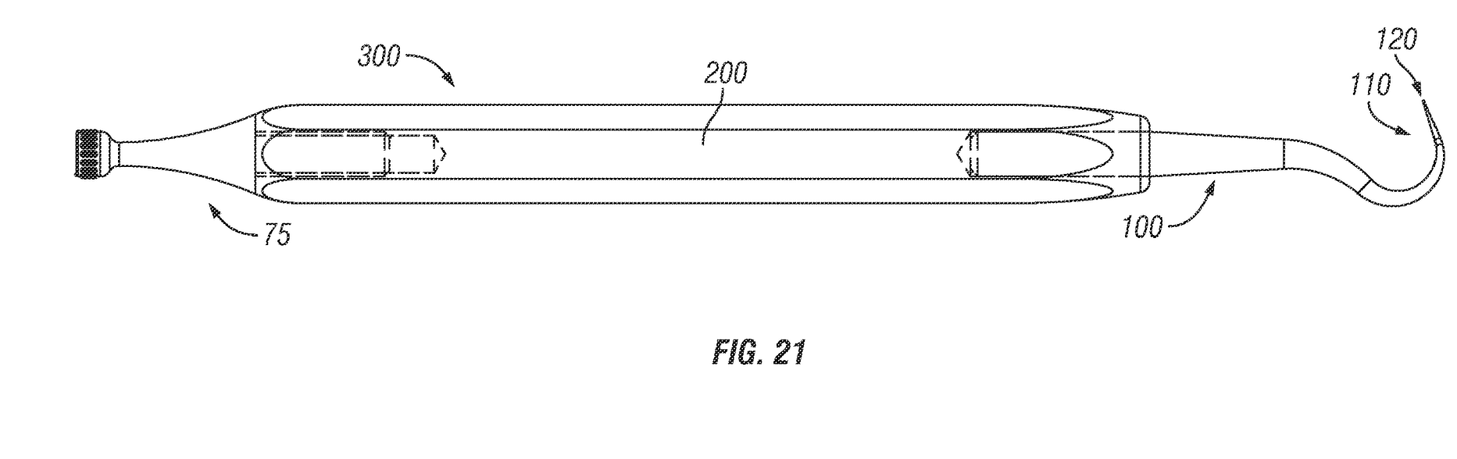
FIG. 21 illustrates a side view of the device in FIG. 15 with internal components.

Turning finally to FIG. 20 and FIG. 21, a complete assembly is exhibited wherein tool handle 200, extraction and insertion device component 75 and extraction tool component 100 are evidenced as a single unit 300. As described above, this arrangement may be interchangeable or permanent as to allow for removal and replacement of parts or for provision of a single contiguous device.

In practice, the dental insert 20 residing within dental cap 25 and atop abutment 30 may be removed via extraction tool component 100 via scaler 110 by removing the insert containing overdenture 15 and positioning the overdenture 15 with the inserts 20 facing upward. The dental insert 20 is then removed by impelling said dental insert 20 with the point 120 of hook-shaped scaler 110, angling the tool handle 200 down toward the prosthetic whereby the angled portion 125 of the hook-shaped scaler 110 acts as a fulcrum wherein the dental insert 20 acts as the resistive force and the tool handle 200 acting to receive the motive effort. After a portion of the dental insert 20 is skewered by hook component 100, that section of the dental insert 20 is raised and drawn away from the interior surface of dental cap 25 which is then followed by each other dental insert elastomeric portions until the insert 20 is ultimately removed from the dental cap 25 and thereby the overdenture dental prosthetic 15. The insert 20 is then discarded. Conversely, the dental insert 20 may be removed via insertion of the first extraction and insertion device component 75 head 86 into the convex portion of a dental insert 20 wherein a combination head 86 insertion and rotational forces, through application of raised protrusions "gripping" pressure of each protrusion 85 to the inner walls of the insert 20 creates a removal force greater than the overdenture dental prosthetic 15 retentive force causing extraction therefrom.

In terms of composition, the tool itself is the extraction and insertion device component 75 and tool handle 200 is made of metal or a rigid plastic and the scaler 110 is made of metal or similarly rigid materials. In terms of length, the device itself, in one preferred embodiment, is approximately 4 inches wherein tool handle 200 and extraction and insertion device component 75 make up approximately ¾ of the total length and scaler 110 comprises ¼ of the total length. More specifically, tool handle 200, in one preferred embodiment, may be 2 and ¼ inch and extraction and insertion component 75 may be 0.75 inches where scaler 110 may be approximately 1 inch.

Figures 17, 18, 19:
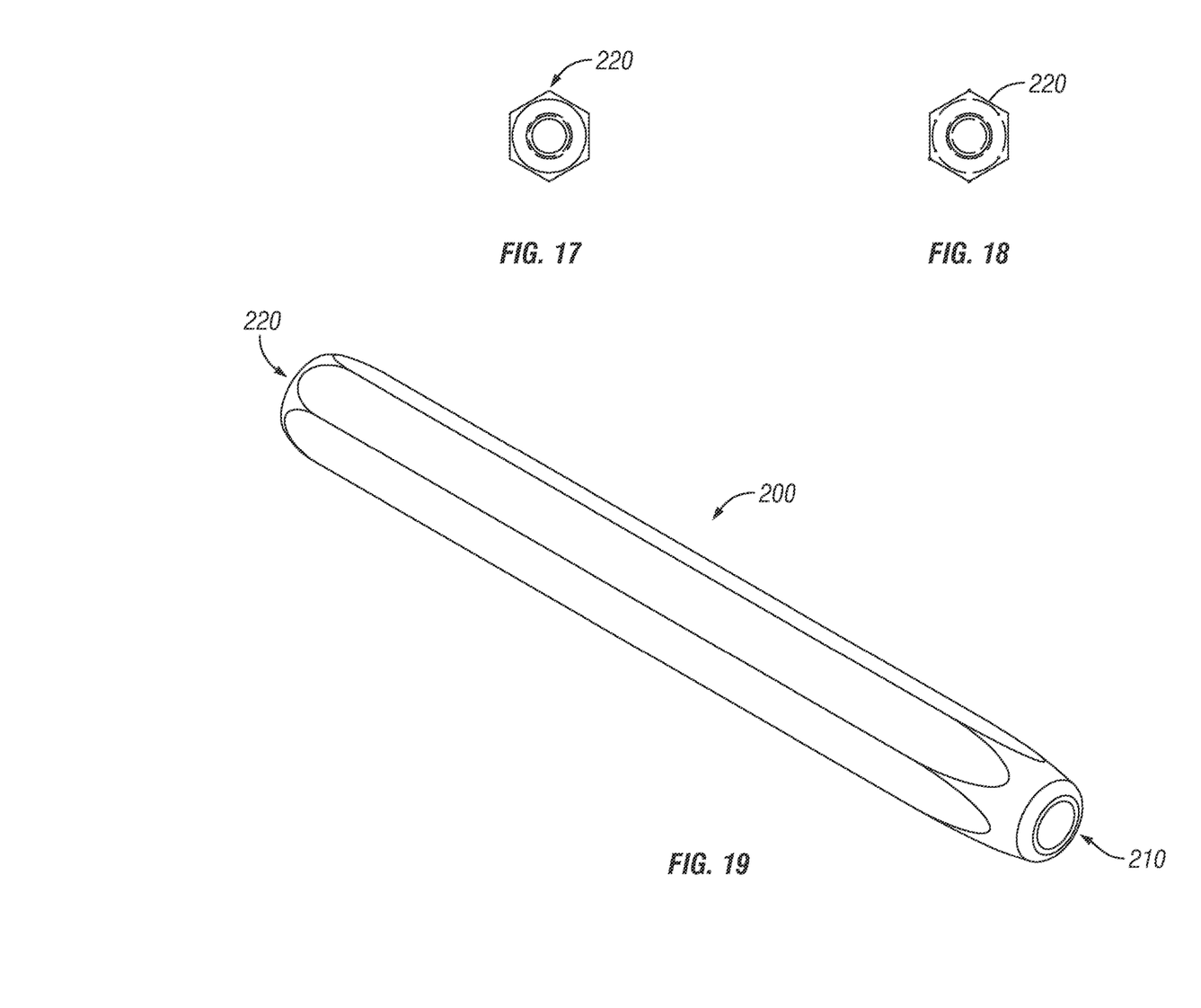
FIG. 17 shows a first end view of the device handle in FIG. 18.
FIG. 18 shows a second end view of the device handle of FIG. 18.
FIG. 19 is a top, perspective view of the handle of FIGS. 15, 16, and 18.

As provided by inventor, in one preferred embodiment, the tool handle 200 may be hexagonal in crosscut (transverse plane) harboring cylindrical cavities (in FIGS. 15 and 16) which appear as circular in FIGS. 17 and 18, bordered by the hexagonal tool handle 200 exterior. As is depicted in FIGS. 15-19 and FIGS. 20 and 21, the tool approximates the size of a 7 mm pencil, intentionally as to provide instant consumer recognition and familiarity with the commensurate size and each first and second ends 210, 220 exhibiting receiving cylinders only slightly larger than shaft 94 and shaft 115.

Scaler 110 is based on the 'universal curette' which provides the requisite rigidity needed to remove insert 20 from dental cap 25. Scaler 110, being the optimal removal device, requires scaler shaft 115 insertion into tool handle 200 a length sufficient to provide the appropriate leverage for insert 20 removal via prying while also warding against bending or breaking. This insertion length may range anywhere from ⅐, ⅙, ⅕, ¼, ⅓, ½, ⅔, ¾, up to an including the entire length of tool handle 200 as necessitated by the amount of force to be applied to insert 20 for leveraged removal. In opposite, first extraction and insertion device component's 75 force, while it may as well use leveraged force, relies more so on insertion and radial (rotational) force for extraction and insertion thereby requiring less inserted length into tool handle 200 for proper insert 20 manipulation and placement. Therefore, any length of tool handle 200 unoccupied by scaler shaft 115 may be reserved for extraction and insertion shaft 94.

It is further envisioned by inventor that insert extraction and insertion tool 300 come packaged singularly, doubly or in groups of a plurality of devices which may come pre-populated with inserts of varying poundages or with a series of poundages included separate from tool 300, either within the same packing or separate.

The particular embodiments disclosed above are merely illustrative, as the apparatus and application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and further defined by the claims. It is evident that the present application, with significant advantages over the prior art, has been described and illustrated. Although the present application is shown in a limited number of forms, arrangements and configurations, it is not limited to just these forms, but is amenable to various changes and modifications without departing from the spirit thereof.

The invention claimed is:

1. An extraction and insertion tool used for prosthetic overdenture dental inserts removal and replacement, the extraction and insertion tool comprising:
 a linear tool handle comprising a first receiving cylindrical cavity at a first end and a second receiving cylindrical cavity at a second end;
 a first operable component exhibiting a conically-shaped neck featuring a first end and a second end;
  said first end of the first operable component exhibiting a blunt, truncated barrel-shaped feature configured to reversibly attach to a dental insert for removal or placement;
  said second end of the first operable component exhibiting a shaft configured for insertion into the first receiving cylindrical cavity or the second receiving cylindrical cavity of the tool handle;

said blunt, truncated barrel-shaped feature exhibiting raised protrusions about an outer surface of said blunt, truncated barrel-shaped feature;

said raised protrusions are configured to provide gripping pressure to inner walls of said dental insert for removal or placement;

a second operable component comprising a first end and a second end;

said first end of the second operable component exhibiting an angled hook scaler with a defined point at a terminus; said angled hook scaler operable to pierce a dental insert for removal;

said second end of the second operable component exhibiting a shaft configured for insertion into the first receiving cylindrical cavity or the second receiving cylindrical cavity of the tool handle.

2. The extraction and insertion tool of claim 1 wherein said first operable component is used for forceable dental insert extraction, dental insert insertion, or both.

3. The extraction and insertion tool of claim 1 wherein said raised protrusions comprising raised half-cylinders, half spheres, half squares, or brail bumps, regularly or irregularly spaced, about the outer surface of said blunt, truncated barrel-shaped feature.

4. The extraction and insertion tool of claim 3 wherein said second operable component is used for dental insert removal.

5. The extraction and insertion tool of claim 2 wherein said tool handle is configured to receive said first operable component or said second operable component interchangeably in the first receiving cylindrical cavity or the second receiving cylindrical cavity, wherein said first and second receiving cylindrical cavities are larger than the shafts of said first and second operable components.

6. The extraction and insertion tool of claim 4 wherein said first operable component and said second operable component are removable fixed into said tool handle.

7. The extraction and insertion tool of claim 5 wherein said tool handle is tubular, angular, solid, hollow or a combination thereof.

8. The extraction and insertion tool of claim 6 wherein said tool handle exhibits an outer surface that is knurled, checkered, or indented to increase friction and ability to grip.

9. The extraction and insertion tool of claim 6 wherein said tool handle and said first operable component are made of metal or rigid plastic, and said second operable component is made of metal.

10. The extraction and insertion tool of claim 6 wherein said tool handle exhibits an outer surface that has angular portions, rounded areas or flat features to create areas capable of gripping.

11. The extraction and insertion tool of claim 6 wherein said tool handle exhibits an outer surface having rubber or neoprene.

* * * * *